April 22, 1924.

J. T. CRALLEY

DOOR

Filed July 22, 1920

1,491,001

Inventor
John T. Cralley
By Laugden Moor
Attorney.

Patented Apr. 22, 1924.

1,491,001

UNITED STATES PATENT OFFICE.

JOHN THOMAS CRALLEY, OF CHICAGO, ILLINOIS, ASSIGNOR TO WALTER P. MURPHY, OF CHICAGO, ILLINOIS.

DOOR.

Application filed July 22, 1920. Serial No. 398,079.

*To all whom it may concern:*

Be it known that I, JOHN T. CRALLEY, a citizen of the United States, residing at Chicago, in the county of Cook and State of Illinois, have invented a new and useful Improvement in Doors, of which the following is a specification.

This invention relates to improvements in doors and more particularly to the side doors of freight cars, which are supported on rollers traveling on a track.

It is the object of this invention to provide a door of this type with a roller mounted on the bottom stiffener of the door, supporting the door centrally above it and which is extremely simple in construction and inexpensive to produce.

While the preferred form of this invention is illustrated upon the accompanying sheet of drawing, yet it is to be understood that minor detail changes may be made without departing from the scope thereof.

In the drawings: Figure 1, is a fragmentary view in side elevation of a side door freight car, illustrating the bottom track and lower part of the door mounted thereon.

The embodiment of this invention is illustrated as applied to a freight car 1, having a bottom supported door 2, mounted to travel on the track 3, secured to the side of the car and extending under and beyond a car door opening. All of which construction is in common use by the railroads.

Figure 1:
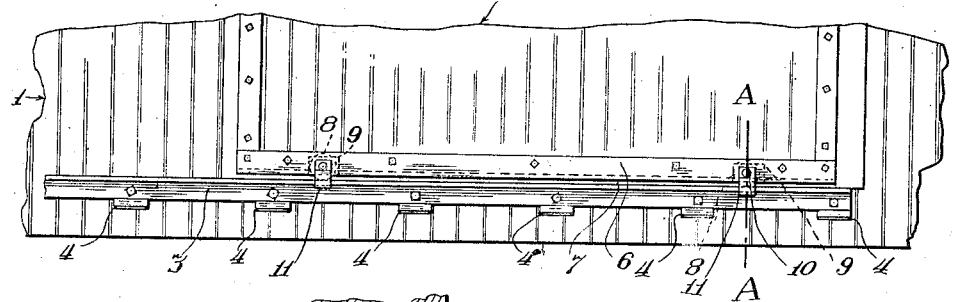
Figure 2:
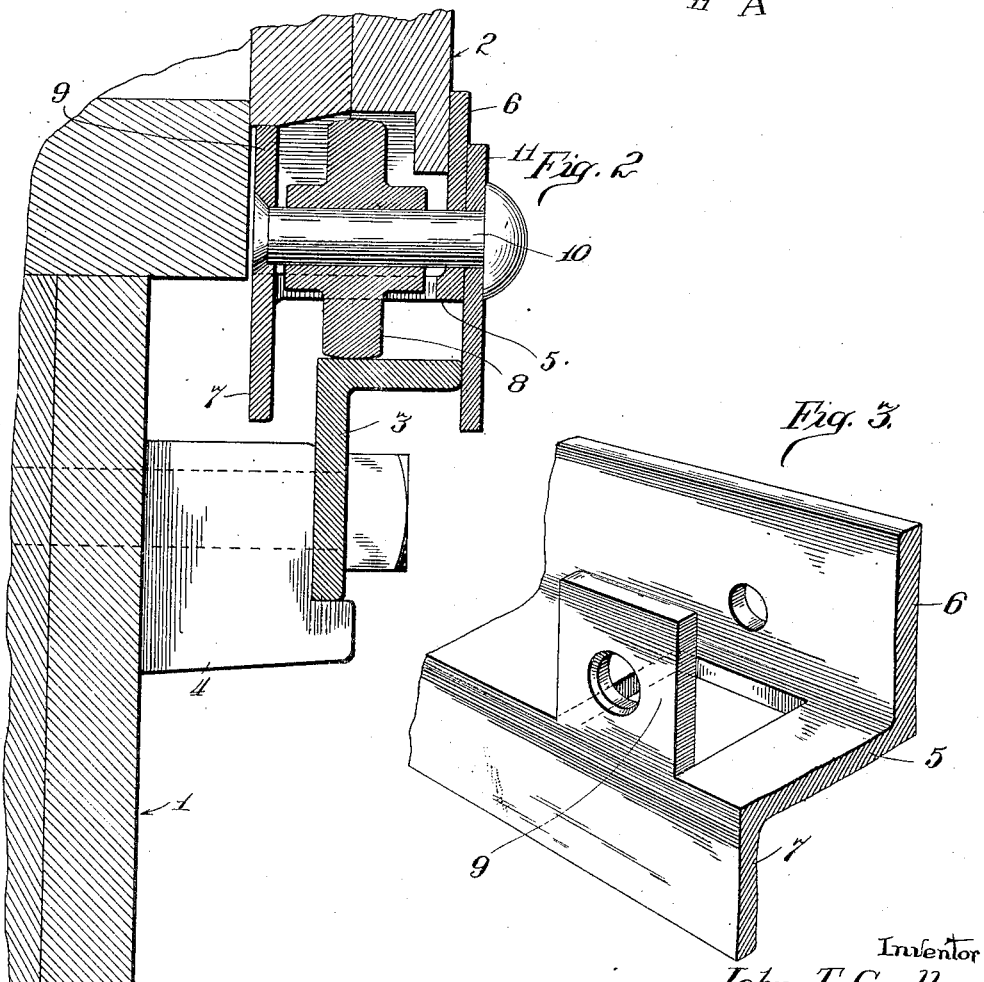
Figure 2, is an enlarged detail view in transverse section taken on the line A—A, Figure 1.
Figure 3:
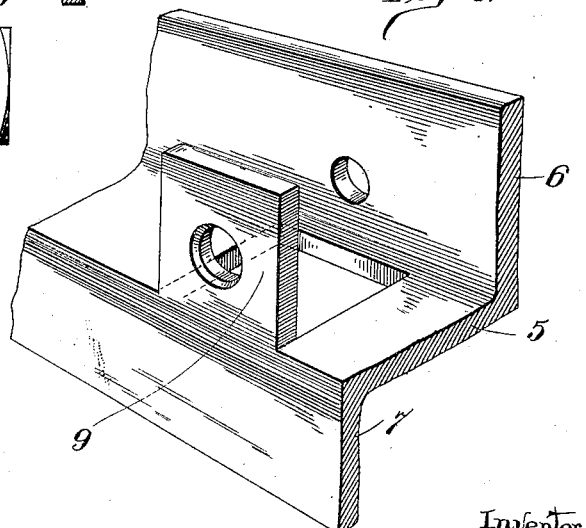
Figure 3, is an enlarged detail view in perspective of the bottom door plate removed illustrating the roller support as constructed in accordance with this invention.

While the rollers are shown mounted near each end of the door their position and number are immaterial to the invention. Likewise the particular form of track is immaterial and the form of track and bottom stiffener of the door, as clearly illustrated in Figure 2, is of usual construction. As shown the track 3, is in the form of an angle iron held away from the side of the car and beneath the bottom of the door by a plurality of supports 4 and having a horizontal flange upon which the door travels. The bottom stiffener of the door is in the form of a Z bar, the web 5 of which extends along the bottom of the door with one vertical flange 6 engaging the outer side of the door while the other flange 7 extends downward in continuation of the innerside of the door and between the track and car body which will prevent the door from swinging outwardly. At each place where it is desired to mount a roller the bottom of the door above the bottom plate is cut away, as shown in Figure 2. The web 5 of the bottom plate is struck up to form a continuation of the lower flange 7, which extends in the same direction and is paralleled to the outer flange 6. This extension 9 forms with the flange 6 a roller support and the aperture formed in the web allows the roller 8 to be mounted therein and rest upon the track. The roller is preferably mounted by piercing bolt or rivet holes in the upstanding portion of the web 9 and outer flange 6 and passing a bolt or rivet 10 through the upstanding portion 9, the roller 8 and outer flange 6 of the Z bar, which bolt or rivet is preferably secured on the outer side. If desired a guide plate 11 may be secured on the outer side of the flange 6 by the roller pivot bolt or rivet. This plate not only protects the roller but prevents its running off the track on the side next the car body.

It is readily seen that by utilizing the web of the bottom plate for supporting one side of the roller a very simple roller bearing is produced which does away with the necessity for cumbersome or special roller brackets, furthermore the roller is contained entirely within the door body without cutting away the outer flange of the Z bar bottom plate. The roller is mounted directly beneath the longitudinal center of the door body so that the weight of the door if equally distributed between the roller supports and the roller is held in positive engagement with the track by the depending flange 7 and guide plate 11.

What I claim is:

1. A door bottom stiffener comprising a web with perpendicular flanges extending therefrom in opposite directions having a portion of the web struck up to form a roller support.

2. In a freight car having a door opening, a track attached to the body of the car below said door opening, a door mounted on a roller to travel on said track, a door bottom stiffener having a web with perpendicular flanges extending therefrom in opposite directions with a portion of said web struck up to form a roller support, one of said perpendicular flanges extending behind said track.

3. In a freight car having a door opening, a track attached to the body of the car below said door opening, a door mounted on a roller to travel on said track, a door bottom stiffener having a web with perpendicular flanges extending therefrom in opposite directions with a portion of said web struck up to form a roller support, one of said perpendicular flanges extending behind said track, and a member perpendicular with said web extending in front of said track.

4. In a freight car having a door opening, a track attached to the body of the car below said door opening, a door mounted on a roller to travel on said track, a door bottom stiffener having a web with pairs of perpendicular members extending therefrom in opposite directions, the upwardly extending pair of members forming roller supports, and the downwardly extending pair of members positioned on either side of said track.

5. In a freight car having a door opening, a track attached to the body of the car below said opening, a door mounted on a roller to travel on said track, a roller bracket having a web with pairs of perpendicular members extending therefrom in opposite directions, the upwardly extending pair of members forming roller supports, and the downwardly extending pair of members positioned on either side of said track.

JOHN THOMAS CRALLEY.